US 6,549,727 B1

(12) United States Patent
Kamata

(10) Patent No.: US 6,549,727 B1
(45) Date of Patent: Apr. 15, 2003

(54) LENS-FITTED PHOTO FILM UNIT WITH FLASH DEVICE

(75) Inventor: Kazuo Kamata, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 180 days.

(21) Appl. No.: 09/609,318

(22) Filed: Jun. 30, 2000

(30) Foreign Application Priority Data

Jul. 1, 1999 (JP) .......................... 11-187873
Jul. 8, 1999 (JP) .......................... 11-195030

(51) Int. Cl.$^7$ .................. G03B 17/02; G03B 15/03; G03B 7/26; G03B 9/04
(52) U.S. Cl. .................. 396/6; 396/176; 396/205; 396/459; 396/543
(58) Field of Search .................. 396/6, 176, 205, 396/459, 543

(56) References Cited

U.S. PATENT DOCUMENTS 6,198,880 B1 * 3/2001 Hosaka et al. .................. 396/6
6,339,679 B1 * 1/2002 Aratame et al. ................. 396/6

FOREIGN PATENT DOCUMENTS

JP          09-015693      * 1/1997 ........... G03B/15/05

* cited by examiner

Primary Examiner—David M. Gray
Assistant Examiner—Rochelle Blackman
(74) Attorney, Agent, or Firm—Young & Thompson

(57) ABSTRACT

A lens-fitted photo film unit includes a main body pre-loaded with photo film. A flash unit is secured to the main body, and emits flash light to a photographic field. An exposure opening is formed in the main body, and introduces light from the photographic field to the photo film. A shutter mechanism is secured to the main body, and opens and closes the exposure opening. A charger switch causes the flash unit to store charge upon being turned on. A changeover plate with a small diameter opening is movable to first and second set positions, and stops down the exposure opening when in the first set position. One end of the changeover plate allows turning on and off the charger switch when the changeover plate is in the first set position, and forcibly turns on the charger switch when the changeover plate is in the second set position.

21 Claims, 10 Drawing Sheets

LENS-FITTED PHOTO FILM UNIT WITH FLASH DEVICE

BACKGROUND OF THE INVENTION

1. Field of the Invention

The present invention relates to a lens-fitted photo film unit with a flash device. More particularly, the present invention relates to a lens-fitted photo film unit with a flash device and changeable in plural photographing modes one of which is suitable for daylight synchronized flash photography.

2. Description Related to the Prior Art

A lens-fitted photo film unit is widely used, which is preloaded with unexposed photo film. It enables a user to take photographs easily. When he or she forwards the lens-fitted photo film unit to a photo laboratory after exposing all frames in a photo film, prints produced from the photo film are supplied to him or her. Also, the processed photo film is returned together.

There is a type of the lens-fitted photo film unit in which an electronic flash device is incorporated for photographing an indoor or night scene. JP-A 09-015693 discloses the lens-fitted photo film unit in which an aperture stop changer mechanism is actuated in response to operation of a charger switch charging the flash device, for changing a diameter of an aperture stop for a photographic optical system with a taking lens.

The lens-fitted photo film unit according to this prior document has a mechanism for increasing the diameter of the aperture stop at the time of an exposure with flash light, namely for setting a decreased value of f-number for the aperture stop. This is effective in photographing an object including a background in an indoor or night scene with insufficient illumination.

In the field of photography, daylight synchronized flash photography is known, in which an exposure is taken with the flash light even under daylight in a sunny weather. The daylight synchronized flash photography is typically effective in a rear light scene, because the flash light can illuminate a principal object and prevents it from being too dark.

If an exposure is taken by daylight synchronized flash photography with the lens-fitted photo film unit according to the above prior document, the aperture stop has the greater diameter even under daylight, to cause an excess in the exposure amount. Overexposed frames causes the negative photo film to increase time required for producing prints from the photo film in the photo laboratory. Efficiency in the printing in the photo laboratory is lowered, so that printing cost per frame is raised. Also, a decrease occurs in the printing quality.

SUMMARY OF THE INVENTION

In view of the foregoing problems, an object of the present invention is to provide a lens-fitted photo film unit with a flash device and capable of photographing an indoor or night scene appropriately and photographing a daylight scene in daylight synchronized flash successfully.

In order to achieve the above and other objects and advantages of this invention, a lens-fitted photo film unit includes a main body pre-loaded with photo film. A flash unit is secured to the main body, for emitting flash light to a photographic field. An exposure opening is formed in the main body, for introducing light from the photographic field to the photo film. A shutter mechanism is secured to the main body, actuated in synchronism with the flash unit, for opening and closing the exposure opening. A charger switch causes the flash unit to store charge upon being turned on. An aperture stop changer is shiftable to first and second set positions, for stopping down the exposure opening when in the first set position. A linking mechanism allows turning on and off the charger switch when the aperture stop changer is in the first set position, and forcibly turns on the charger switch when the aperture stop changer is in the second set position.

The aperture stop changer includes a changeover plate movable to the first and second set positions. A small diameter opening is formed in the changeover plate, has a diameter smaller than a diameter of the exposure opening, is set at the exposure opening when the changeover plate is in the first set position, and set away from the exposure opening when the changeover plate is in the second set position.

Furthermore, a charger member turns on the charger switch upon being operated externally. The changeover plate is disposed to extend between the exposure opening and the charger switch. The linking mechanism includes a first end of the changeover plate, and the first end is away from between the charger switch and the charger member when in the first set position, and is behind the charger member when in the second set position to press a front of the charger switch.

Furthermore, an operation projection is formed to project from the changeover plate, operable externally, for moving the changeover plate to the first and second set positions.

Furthermore according to a preferred embodiment, a charger button portion is formed with the changeover plate, extended from a front face of a first end thereof closer to the charger switch, deformable with resiliency, for turning on the charger switch upon being depressed externally.

The linking mechanism includes a rear face of the first end, the rear face is away from a front face of the charger switch when the changeover plate is in the first set position, and pushes the front face of the charger switch when the changeover plate is in the second set position.

The linking mechanism further includes a projection for projecting from the rear face of the first end.

Furthermore, a front cover covers a front of the main body. An access opening is formed in the front cover, and disposed in front of the charger button portion. An operation projection is formed to project from the charger button portion, operated externally through the access opening, for sliding of the changeover plate and for depression of the charger button portion.

Furthermore according to another preferred embodiment, a large diameter opening is formed in the changeover plate, has a diameter larger than the diameter of the small diameter opening, and is set at the exposure opening when the changeover plate is in the second set position.

The large diameter opening comprises an arc-shaped recess formed in one end of the changeover plate.

The photo film has speed from ISO 800 to ISO 3200, the exposure opening has an f-number from f/5.6 to f/8, and the small diameter opening has an f-number from f/13 to f/27.

Furthermore according to still another preferred embodiment, a charger member is movable to first, second and third mode positions, wherein the charger member, when in the first mode position, turns off the charger switch, and when in the second mode position, turns on the charger switch and causes the linking mechanism to move the changeover plate to the first set position, and when in the third mode position, causes the linking mechanism to move the changeover plate to the second set position.

The linking mechanism includes an end portion of the changeover plate. A spring biases the changeover plate to the first set position. A driving projection is formed to project from the charger member, disposed close to the end portion, wherein the driving projection, when the charger member is in the first and second mode positions, is moved away from the end portion, and when the charger member is in the third mode position, presses the end portion to move the changeover plate to the second set position.

The changeover plate is pivotally movable.

The flash unit has a circuit board. The charger switch includes first and second contact points disposed in a front of the circuit board. The charger member includes a contact segment for being away from at least one of the first and second contact points when in the first mode position, and for contacting the first and second contact points simultaneously when in the second and third mode positions.

The second mode position is disposed between the first and third mode positions.

The charger member is slidable to the first, second and third positions.

According to another aspect of the invention, a charger switch causes the flash unit to store charge upon being turned on. An aperture stop changer is shiftable to first and second set positions, for stopping down the exposure opening when in the first set position. A charger member is movable to first, second and third mode positions upon being operated externally, for turning off the charger switch when in the first mode position, and for turning on the charger switch when in the second and third mode positions. A linking mechanism shifts the aperture stop changer to the first set position when the charger member is in the first and second mode positions, and shifts the aperture stop changer to the second set position when the charger member is in the third mode positions.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
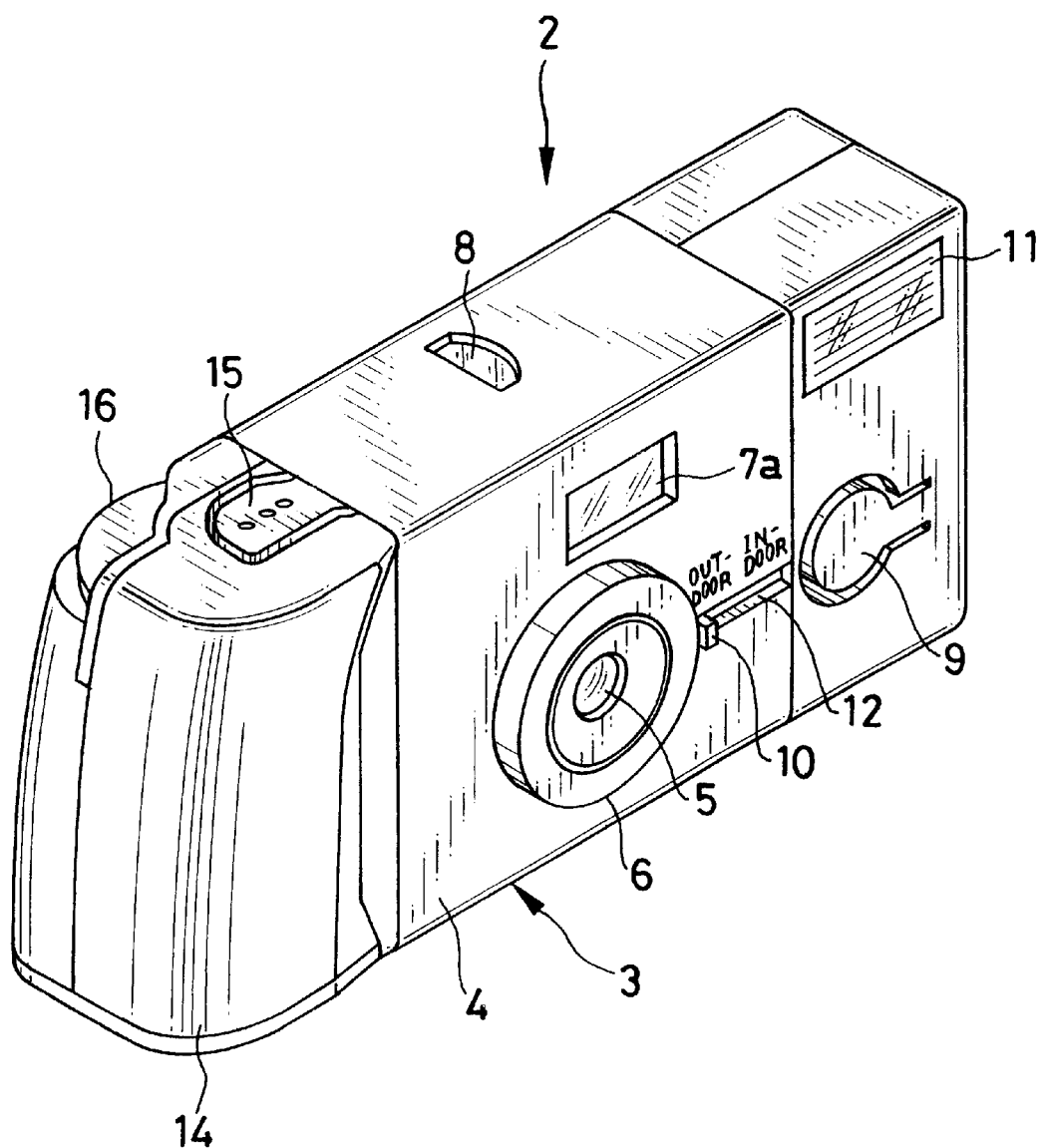
FIG. 1 is a perspective illustrating a lens-fitted photo film unit.

In FIG. 1, a lens-fitted photo film unit 2 consists of a housing 3, which accommodates structures for taking an exposure, and has a belt 4 wound about its center. In the belt 4, there are openings for uncovering a hood 6 for a 30 taking lens 5, a viewfinder objective lens 7a of a viewfinder 7, a frame counter disk 8 and the like. In addition to the taking lens 5 and the viewfinder objective lens 7a, the front of the housing 3 has a charger button 9, an operation projection 10 and a flash emitter 11.

A slot 12 is formed in a front wall of the housing 3, and supports the operation projection 10 in a horizontally slidable manner. The operation projection 10 is stopped by clicked engagement of a claw and a notch in right and left end positions. A surface of the belt 4 is provided with printed letters of OUTDOOR and INDOOR associated with respectively the end positions of the operation projection 10. The OUTDOOR position is a set position of an outdoor mode for use in outdoor photography under daylight in a sunny or half cloudy weather. The INDOOR position is a set position of an indoor mode for use in indoor photography or photography at night. When the operation projection 10 is set in the OUTDOOR position, an exposure opening is stopped down to an aperture stop of f/13. When the operation projection 10 is set in the INDOOR position, the exposure opening still has an aperture stop of f/5.6 without being stopped down.

A side portion of the housing 3 is a grip 14 that a user's right hand manually grasps to hold the lens-fitted photo film unit. A shutter release button 15 is disposed on the top of the grip 14. A winder wheel 16 is disposed in the rear of the grip 14, and rotated by a thumb of the user's right hand.

Figure 2:
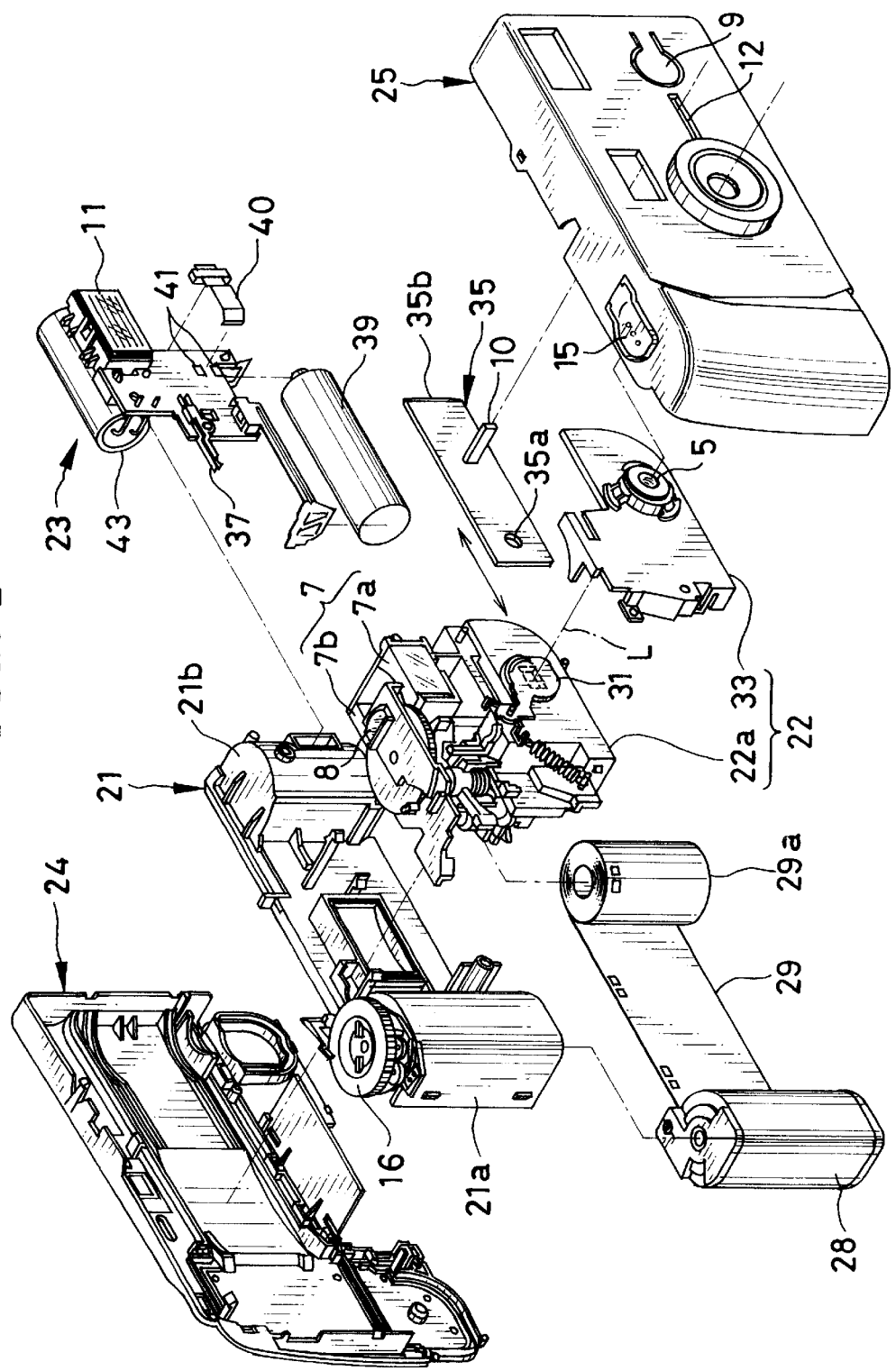
FIG. 2 is an exploded perspective illustrating the lens-fitted photo film unit.

In FIG. 2, the housing 3 is constituted by a main body 21, an exposure unit 22, an electronic flash unit 23, a rear cover 24 and a front cover 25, which are secured to one another by engagement of hooks.

In the main body 21, a cassette holder chamber 21a is formed to contain a cassette 28. A roll holder chamber 21b is formed to contain a photo film roll 29a that is formed by drawing photo film 29 from the cassette 28 and winding the same in a roll form in the manufacturing process. The lens-fitted photo film unit 2 has a fixed shutter speed of 1/60 second, and has a fixed focal length, and lacks focusing operation. The photo film 29 has as high speed as ISO 800, because of high latitude and because it allows lowering the aperture stop to raise the depth of field.

A base portion of the exposure unit 22 is a light-shielding tunnel 22a, which is provided with elements including a shutter mechanism, a shutter cocking mechanism, a one-frame advancing mechanism, and the frame counter disk 8. A shutter blade 31 is included in the shutter mechanism.

Also, the light-shielding tunnel 22a supports the viewfinder objective lens 7a and an eyepiece lens 7b constituting the viewfinder 7. A lens holder 33 in the exposure unit 22 holds the taking lens 5, and is secured to the light-shielding tunnel 22a in front of the shutter blade 31.

A changeover plate 35 as an aperture stop changer is disposed between the shutter blade 31 and the lens holder 33, is provided with the operation projection 10, and slidable horizontally. A small diameter opening 35a is formed in the changeover plate 35, has a circular shape, and is moved into and away from a photographic light path L when the changeover plate 35 is slid. A first end 35b of the changeover plate 35 has a tapered shape with a decreasing thickness, and operates as a linking mechanism.

The flash unit 23 includes the flash emitter 11 and a circuit board 38. A sync switch 37 in the circuit board 38 generates a trigger signal in response to actuation of the shutter mechanism. The circuit board 38 is supplied with power by a dry battery 39.

A contact segment 40 in a charger switch is secured to the periphery of the roll holder chamber 21b. Contact points 41 in the charger switch are included in the circuit board 38. To start charging the flash unit 23, the contact segment 40 is deformed resiliently by the charger button 9 and contacts the contact points 41. The contact points 41 are interconnected or short-circuited to turn on the charger switch.

Figure 3A:
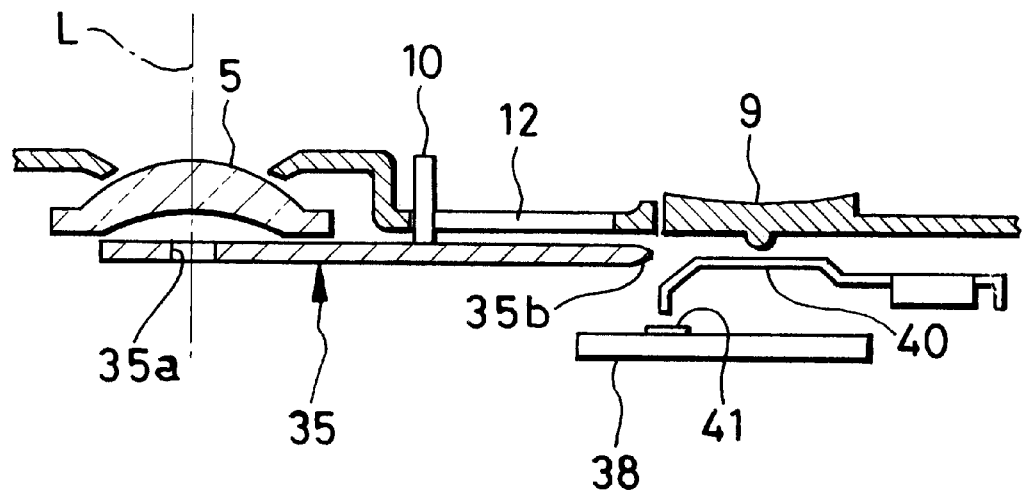
FIG. 3A is a horizontal section illustrating a taking lens, a changeover plate and a charger switch in a state of a small aperture stop.

In FIG. 3A, the operation projection 10 is set at the OUTDOOR position. The small diameter opening 35a is set in the photographic light path. The aperture stop of the optical system is set at f/13. When the charger button 9 is depressed, the contact segment 40 is resiliently deformed by the inside of the charger button 9. An end of the contact segment 40 interconnects the contact points 41 to start charging in the flash circuit. Once the contact points 41 are connected with each other, the charging continues even when the connection is discontinued, until a main capacitor 43 is charged to have a predetermined voltage. Thus, the charging operation is completed. The flash circuit operates according to, for example, the disclosure of JP-A 07-122389.

Figure 3B:
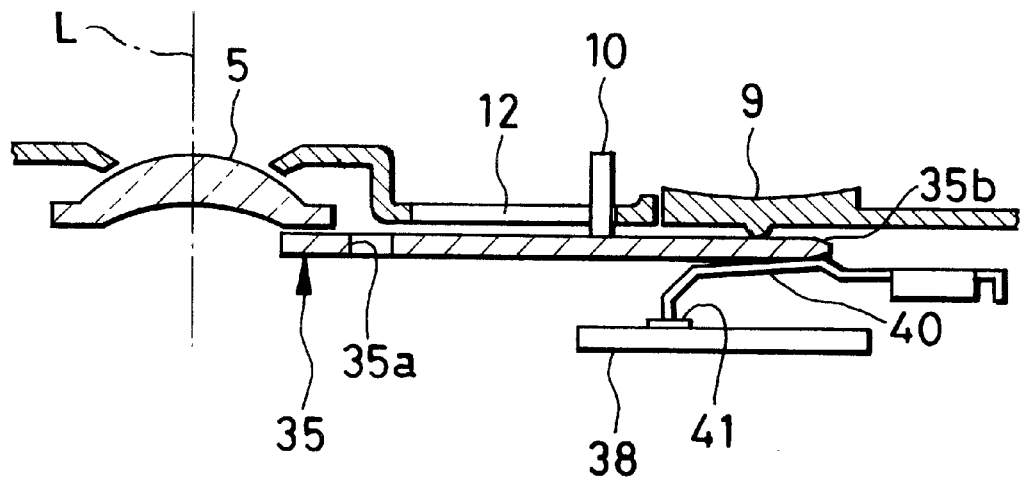
FIG. 3B is a horizontal section illustrating the same as FIG. 3A but in a state of a large aperture stop.

When the operation projection 10 is set at the letters INDOOR as depicted in FIG. 3B, the changeover plate 35 is retracted from the photographic light path. The aperture stop for the taking lens 5 becomes f/5.6 with the exposure opening open fully. At the same time, the first end 35b of the changeover plate 35 becomes inserted between the charger button 9 and the contact segment 40, deforms the contact segment 40 with resiliency, and keeps the contact points 41 interconnected. Thus, the flash unit 23 is caused forcibly to operate for every exposure.

In operation, a user rotates the winder wheel 16 in the lens-fitted photo film unit 2 at first to advance one frame of the photo film 29. A first frame is set at the exposure aperture. The shutter mechanism is cocked at the same time as the frame advance. The one-frame advancing mechanism is actuated to block rotation of the winder wheel 16.

Then one of the two photographic modes is designated according to the brightness of the object. If a sufficient amount of object light is ensured, for example, when an outdoor scene under daylight is photographed, then the OUTDOOR mode is designated. The user visually checks that the operation projection 10 is located at the letters OUTDOOR. The changeover plate 35 is inserted in the photographic light path, to set the small diameter opening 35a behind the taking lens 5.

After a photographic field is framed by use of the viewfinder 7, the shutter release button 15 is depressed. Then the shutter blade 31 opens and closes to take an exposure in the photo film 29 by object light passed through the taking lens 5 and the small diameter opening 35a. In the outdoor mode, the exposure is according to flux in the center of the taking lens 5 because of the small diameter opening 35a, and thus is not influenced remarkably by aberration. An image can be photographed with high sharpness. Also, the depth of field is high. The exposure can be taken without much consideration of a subject distance.

If a principal object is illuminated by rear light in a daytime outdoor scene, the charger button 9 is depressed with the operation projection 10 set at the letters OUTDOOR, to take an exposure with daylight synchronized flash. The charging of the flash circuit is started with the aperture stop kept at f/13. Even after depression of the charger button 9 is discontinued, charging of the main capacitor 43 continues until voltage across the main capacitor 43 comes up to a predetermined charged voltage.

A user checks the completion of the charging operation of the flash unit 23 through the charging check window, and then depresses the shutter release button 15. The shutter is opened and closed, to turn on the sync switch 37. The flash emitter 11 is caused to illuminate the photographic field with flash light. Accordingly, an object can be photographed brightly even in a rear light scene in which the object is less bright than a background. Note that, in the outdoor mode, there is no automatic charging and no forcible emission of flash. At each time that a user desires daylight synchronized flash photography, he or she depresses the charger button even after an exposure with flash.

To photograph an indoor or night scene, the indoor mode is designated. The user manually sets the operation projection 10 at the letters INDOOR. The changeover plate 35 is moved away from the photographic light path to keep the aperture stop at f/5.6 without being stopped down. As the first end 35b of the changeover plate 35 is set between the charger button 9 and the contact segment 40, the contact segment 40 is resiliently deformed to connect the contact points 41 with each other. The charging of the flash unit 23 is continued.

A user checks the completion of the charging operation of the flash unit 23, and then depresses the shutter release button 15. As the aperture stop is f/5.6 to obtain a high amount of exposure, a scene can be photographed without an underexposed state. Even light of indoor illumination can be utilized effectively. The shutter is opened and closed, to turn on the sync switch 37. The flash emitter 11 is caused to illuminate the photographic field with flash light. Immediately, the charging is started automatically. The indoor mode is determined to charge the flash unit 23 in an automatically consecutive manner. If the user desires to discontinue charging the flash unit 23, he or she slides the operation projection 10 back to the OUTDOOR position.

After all the frames are exposed, the lens-fitted photo film unit 2 is brought to a photo finisher and forwarded to a photo laboratory. Then the photo film 29 is developed and subjected to printing. In the photo film, frames of rear light scenes have negative density at an optimum level. Thus, time required for printing can be as short as that required for frames photographed with medium exposures. There is no increase in efficiency in the photofinishing operation in the photo laboratory. Produced prints are then supplied to the user, to whom the processed photo film is returned together.

Figure 4A:
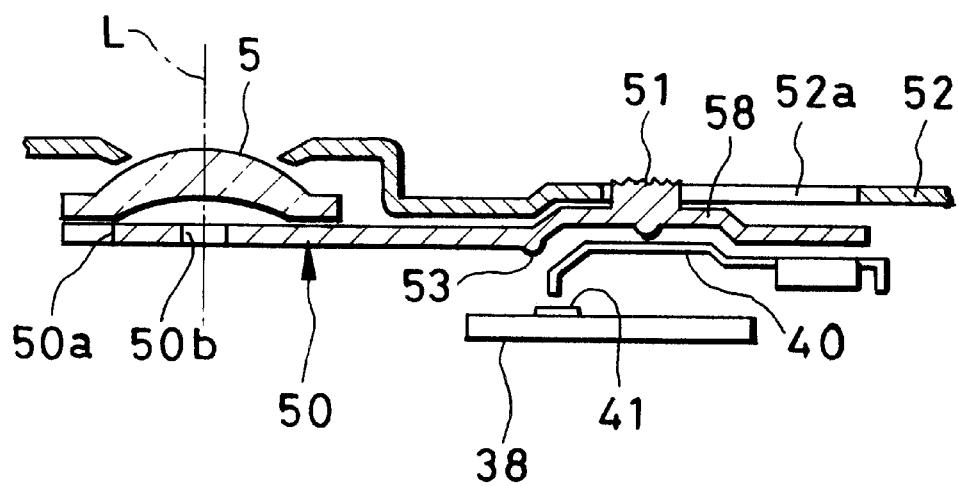
FIG. 4A is a horizontal section illustrating another preferred embodiment with a changeover plate in a state of a small aperture stop.
Figure 4B:
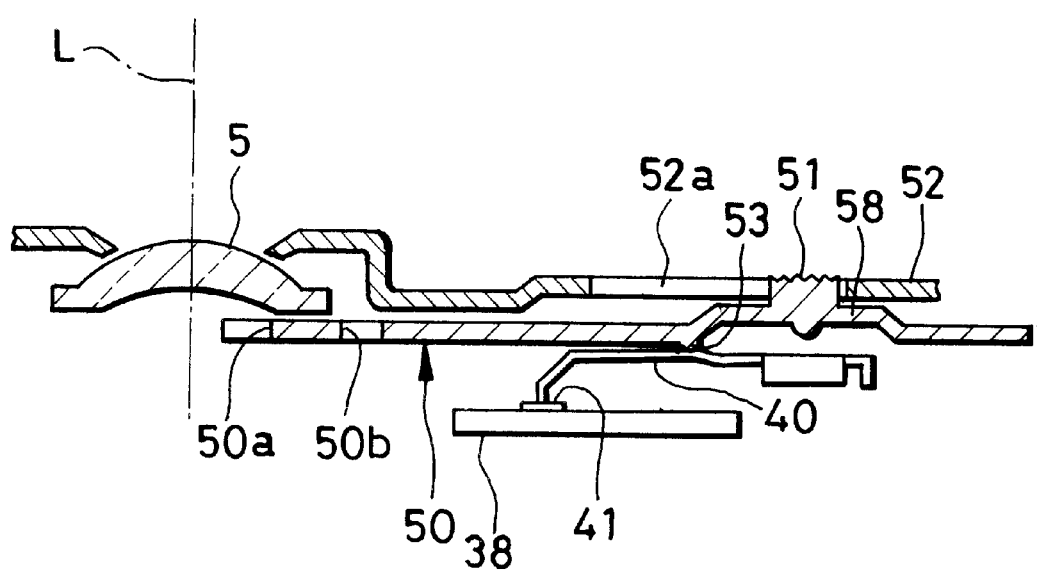
FIG. 4B is a horizontal section illustrating the same as FIG. 4A but in a state of a large aperture stop.
Figure 5:
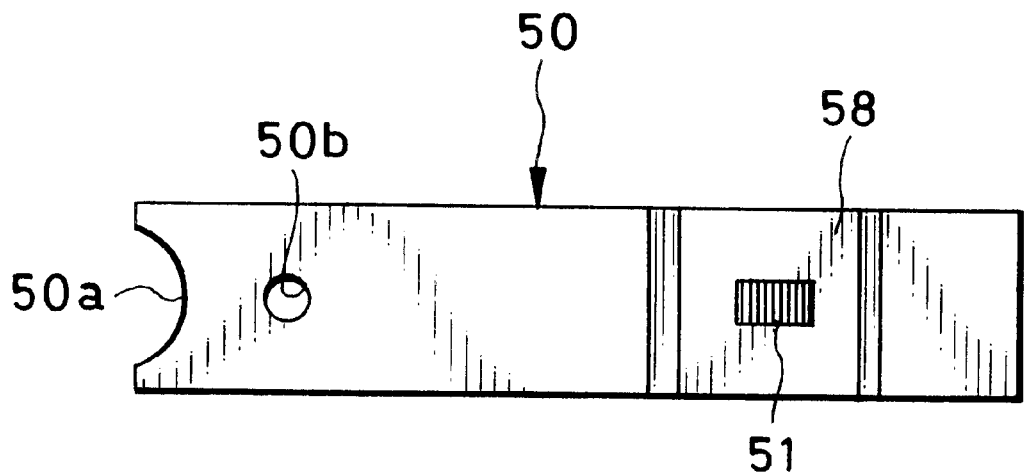
FIG. 5 is a front elevation illustrating the changeover plate of FIGS. 4A and 4B.

In FIGS. 4A, 4B and 5, another preferred embodiment is illustrated. A changeover plate 50 as an aperture stop changer is one piece including an operation projection 51 and a charger button portion 58, the operation projection 51 protruding from the charger button portion 58 and being operable for selectively designating the indoor and outdoor modes. A plate portion of the changeover plate 50 is provided with a large diameter arc-shaped recess 50a and a small diameter opening 50b in a circular shape. An access opening 52a is formed in a front cover 52. The changeover plate 50 is slid by pushing the operation projection 51 horizontally in the access opening 52a, and movable either to the first set position where the small diameter opening 50b is set in the photographic light path or to the second set position where the large diameter recess 50a is set in the photographic light path. Note that the small diameter opening 50b has a diameter equal to that of the small diameter opening 35a according to the above embodiment. The large diameter recess 50a has a diameter greater than that of the exposure opening without being stopped down.

When the changeover plate 50 is in the first set position for the small aperture stop, the operation projection 51 is disposed in front of the contact segment 40. When the operation projection 51 is depressed, the changeover plate 50 is deformed to push the contact segment 40 to the circuit board 38 to connect the contact points 41 with each other. When depression of the operation projection 51 is discontinued, resiliency of the contact segment 40 and the changeover plate 50 causes the contact segment 40 and the operation projection 51 to return to the initial positions. The contact points 41 are disconnected from each other.

If the changeover plate 50 is in the second set position for the large aperture stop, the operation projection 51 is moved away from the contact segment 40. A linking projection 53 in a linking mechanism on a rear face of the changeover plate 50 depresses the contact segment 40 to the circuit board 38. The contact points 41 are kept interconnected by the end of the contact segment 40.

It is to be noted that there is a pair of brackets (not shown), disposed on the rear of the front cover 52, for supporting the changeover plate 50 in a slidable manner. The brackets also operate to keep the charger button portion 58 depressible with resiliency.

Note that the changeover plate 50 may lack the linking projection 53. An edge of the flat rear face of the changeover plate 50 can depress the contact segment 40 directly.

In the present embodiment, the operation projection 51 has a structure both slidable and depressible. However, an alternative changeover plate may have the operation projection 51 disposed in a not depressible portion beside the charger button portion 58. It is possible to slide the changeover plate only by operating the operation projection 51, and to depress the charger button portion 58 without operating the operation projection 51.

Figure 6:
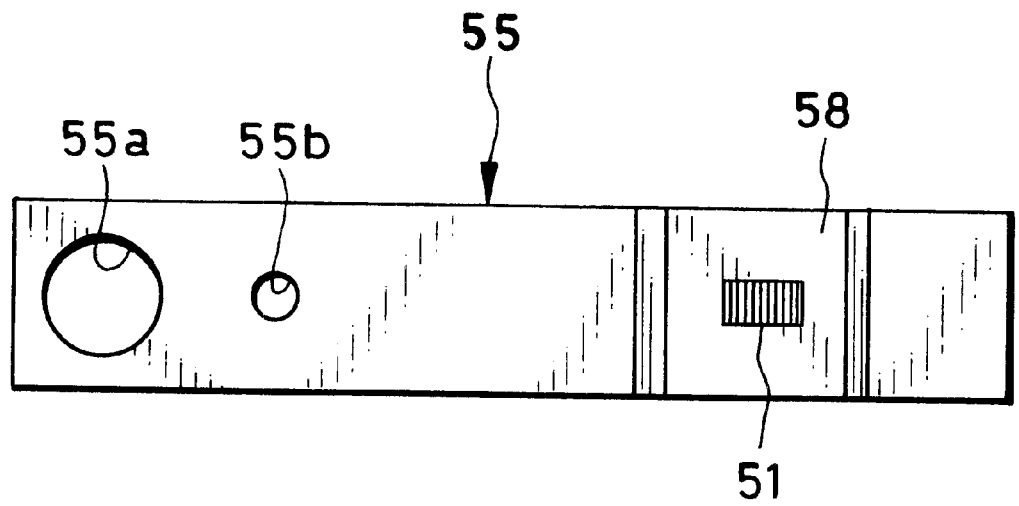
FIG. 6 is a front elevation illustrating another preferred changeover plate with a large diameter opening.

In FIG. 6, still another preferred changeover plate 55 is illustrated. Its length is smaller than that of the changeover plate 50 of the above embodiment. A large diameter circular opening 55a is formed instead of the large diameter recess 50a. A diameter of the large diameter opening 55a can be equal to or smaller than the exposure opening being open fully. It is possible to predetermine the diameter of the large diameter opening 55a in consideration of the indoor mode to make it unnecessary to consider the size of the exposure opening. The degree of freedom in designing the predetermined larger one of the two aperture stops in the lens-fitted phot film unit. If the large diameter opening 55a has the diameter greater than that of the exposure opening, the larger aperture stop is the same as when the exposure opening defines the aperture stop without being stopped down. If the large diameter opening 55a has the diameter smaller than that of the exposure opening, the larger aperture stop makes it possible to photograph an image with higher depth of field and higher sharpness, and the difference in the light amount between the background and the principal object is greater typically when an indoor scene is photographed. Note that a small diameter opening 55b is substantially the same as the small diameter openings 35a and 50b.

In the above embodiments, the f-number of the aperture stop of the exposure opening without being stopped down is f/5.6. The f-number of the aperture stop of the small diameter openings 35a, 50b and 55b is f/13. The shutter speed of the shutter blade 31 is $\frac{1}{60}$. The photo film speed of the photo film 29 is ISO 800. Furthermore, those values may be changed. For example, the f-number of the aperture stop of the exposure opening without being stopped down may be in a range from f/5.6 to f/8. The f-number of the aperture stop of the small diameter openings 35a, 50b and 55b may be in a range from f/13 to f/27. The shutter speed of the shutter blade 31 may be in a range from $\frac{1}{60}$ to $\frac{1}{120}$. The photo film speed of the photo film 29 may be in a range from ISO 800 to ISO 3200.

In the above embodiment, the flash circuit has such a structure that it starts being charged only after the charger switch is turned on for a short time. However, a flash circuit may have such a structure that it continues being charged only while the charger switch is continuously turned on.

Furthermore, the charger button may have a slidable structure instead of the depressible structure. With this structure, an additional mechanism can be provided in the changeover plate for keeping the charger button positioned to turn on the charger switch when in the large aperture stop state. Also, a mechanism can be provided for keeping the charger switch turned on irrespective of the position of the charger button when in the large aperture stop state.

Also, the charger member may be a slidable plate or button movable between the on and off positions. Before the slidable plate is returned to the off position, the slidable plate can be kept in the on position to continue the charging operation in the small aperture stop state.

In the above embodiments, the small diameter openings 35a, 50b and 55b and the large diameter opening 55a are circular. However, any of those may have a quadrilateral shape corresponding to the shape of each frame.

Figure 7:
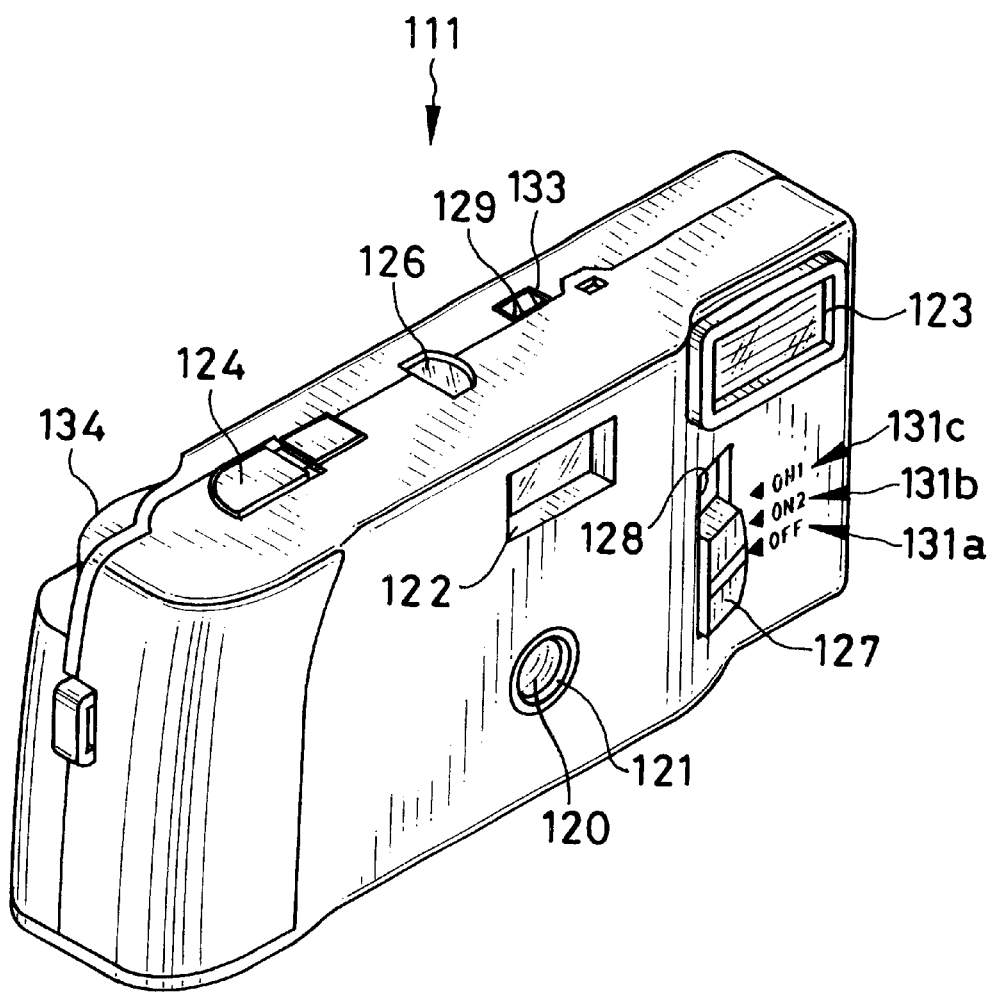
FIG. 7 is a perspective illustrating another preferred lens-fitted photo film unit changeable in three modes.
Figure 8:
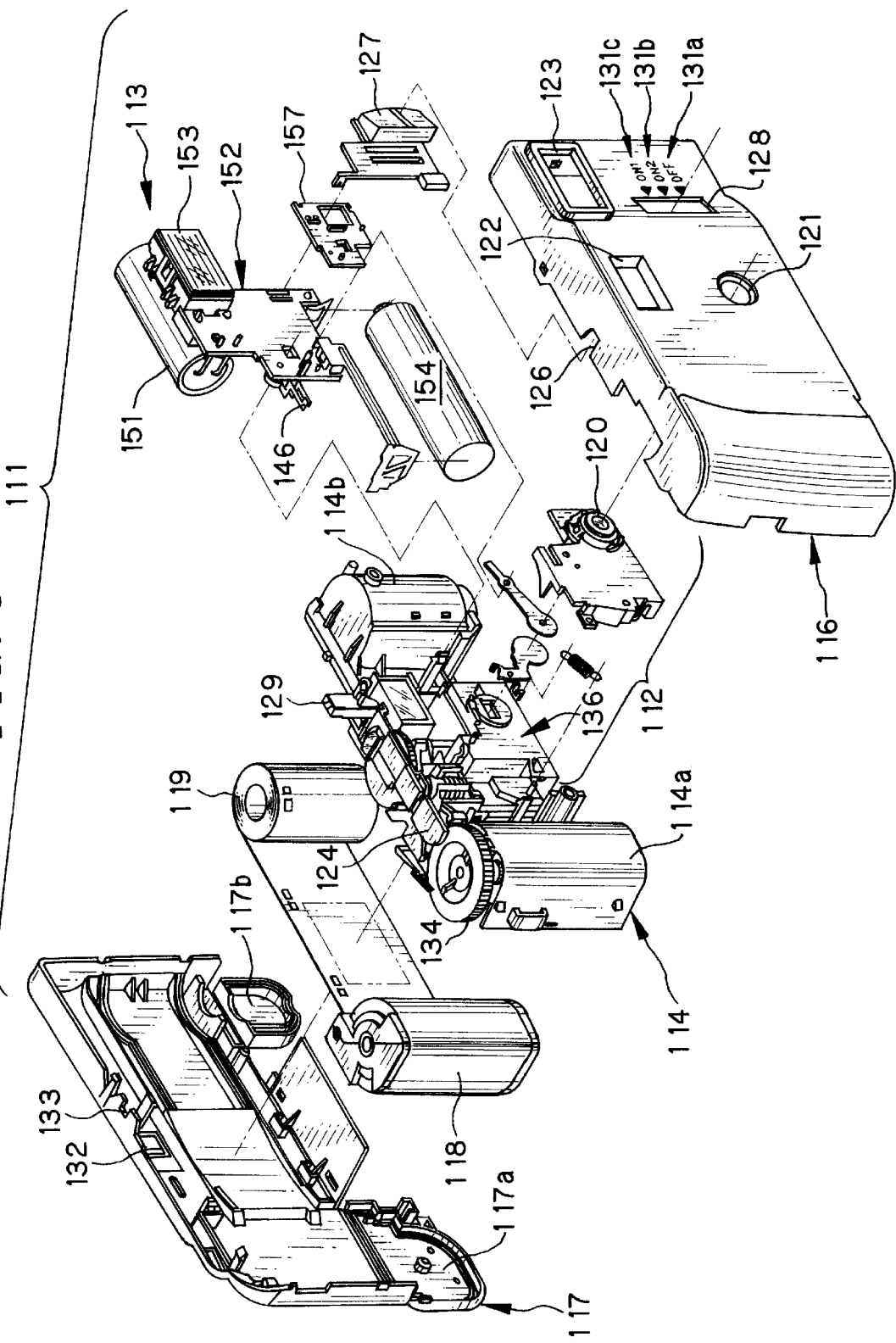
FIG. 8 is an exploded perspective illustrating the lens-fitted photo film unit of FIG. 7.

In FIGS. 7 and 8, another preferred lens-fitted photo film unit 111 is illustrated. A housing of the lens-fitted photo film unit 111 includes a main body 114, a front cover 116 and a rear cover 117. The main body 114 is provided with an exposure unit 112 and an electronic flash unit 113. Also, the housing accommodates a cassette 118 and a photo film 119 drawn from the cassette 118 and wound in a roll form. In manufacturing the lens-fitted photo film unit 111, the cassette 118 is inserted in a cassette holder chamber 114a. The roll of the photo film 119 is contained in roll holder chamber 114b. The photo film 119 has photo film speed of, for example, ISO 1600.

In the front cover 116 are formed a lens opening 121, a viewfinder objective window 122 and a flash window 123. A taking lens 120 appears in the lens opening 121. An upper wall portion of the front cover 116 has a frame counter window 126 and an opening with which a shutter release button 124 is formed. An opening 128 is formed in the front cover 116 beside the lens opening 121, and keeps a charger member 127 externally operable.

The charger member 127 is slidable vertically, and operable to start and discontinue the charging operation of the flash unit 113. After the charging of the flash unit 113 is completed, the charging completion lamp emits light. A light guide member 129 guides the light externally to be checked by a user. The charger member 127 operates as a flash changeover member to select the use and the lack of the use of the flash unit 113.

Upon the slide of the charger member 127, the aperture stop at the exposure opening is changed over. As will be described later in detail, two aperture stops are predetermined, a first one as not being stopped down, and the second being defined by an opening with a diameter smaller than that of an opening for the first. There three sliding positions for the charger member 127, including first, second and third mode positions 131a, 131b and 131c, which are indicated by pointer signs and letters of respectively OFF, ON2 and ON1 beside the opening 128. In the lens-fitted photo film unit 111, there are three predetermined photographing modes according to combinations of the use and the lack of the use of flash, and the aperture stops.

The three photographing modes are selected by sliding the charger member 127 to respectively the three positions.

The three mode positions 131a, 131b and 131c are associated with respectively the first, second and the third photographing modes.

The first mode position 131a is a position for a "daylight mode", in which the flash circuit is not charged. The exposure opening is set with the small aperture stop. The daylight mode is used when a sufficient amount of object light is ensured, for example, when an outdoor scene under daylight is photographed.

The second mode position 131b is a position for a "daylight flash mode", in which the flash circuit is charged. The exposure opening is set with the small aperture stop. The daylight flash mode is used when a principal object is illuminated by rear light under daylight. A front side of the principal object is likely to be dark because the principal object intercepts the daylight. So flash light is applied to the principal object in the daylight flash mode, to eliminate the shadowy appearance of the front side.

The third mode position 131c is a position for an "indoor/night mode", in which the flash circuit is charged. The exposure opening is set with the large aperture stop. The indoor/night mode is used when an amount of object light is not sufficient, for example, when an indoor scene or night scene is photographed.

The rear cover 117 is provided with an eyepiece window 132 and a charging check window 133 for externally disposing the light guide member 129. Also, lower lids 117a and 117b are formed with the rear cover 117 to cover lower openings of the cassette holder chamber 114a and the roll holder chamber 114b light-tightly. The lower lid 117a is opened at the time of removing the cassette 118 after the photo film becomes contained therein.

A winder wheel 134 is disposed on the top of the cassette holder chamber 114a. A shaft is formed on a lower face of the winder wheel 134, and is connected with a spool of the cassette 118. At each time that one frame is exposed, the winder wheel 134 is rotated to feed the photo film into the cassette 118 by an amount of one frame. By the one-frame advancing operation, the shutter mechanism in the exposure unit 112 is cocked and becomes ready for another exposure. A lock lever in the exposure unit 112 comes to keep the winder wheel 134 from rotating.

Figure 9:
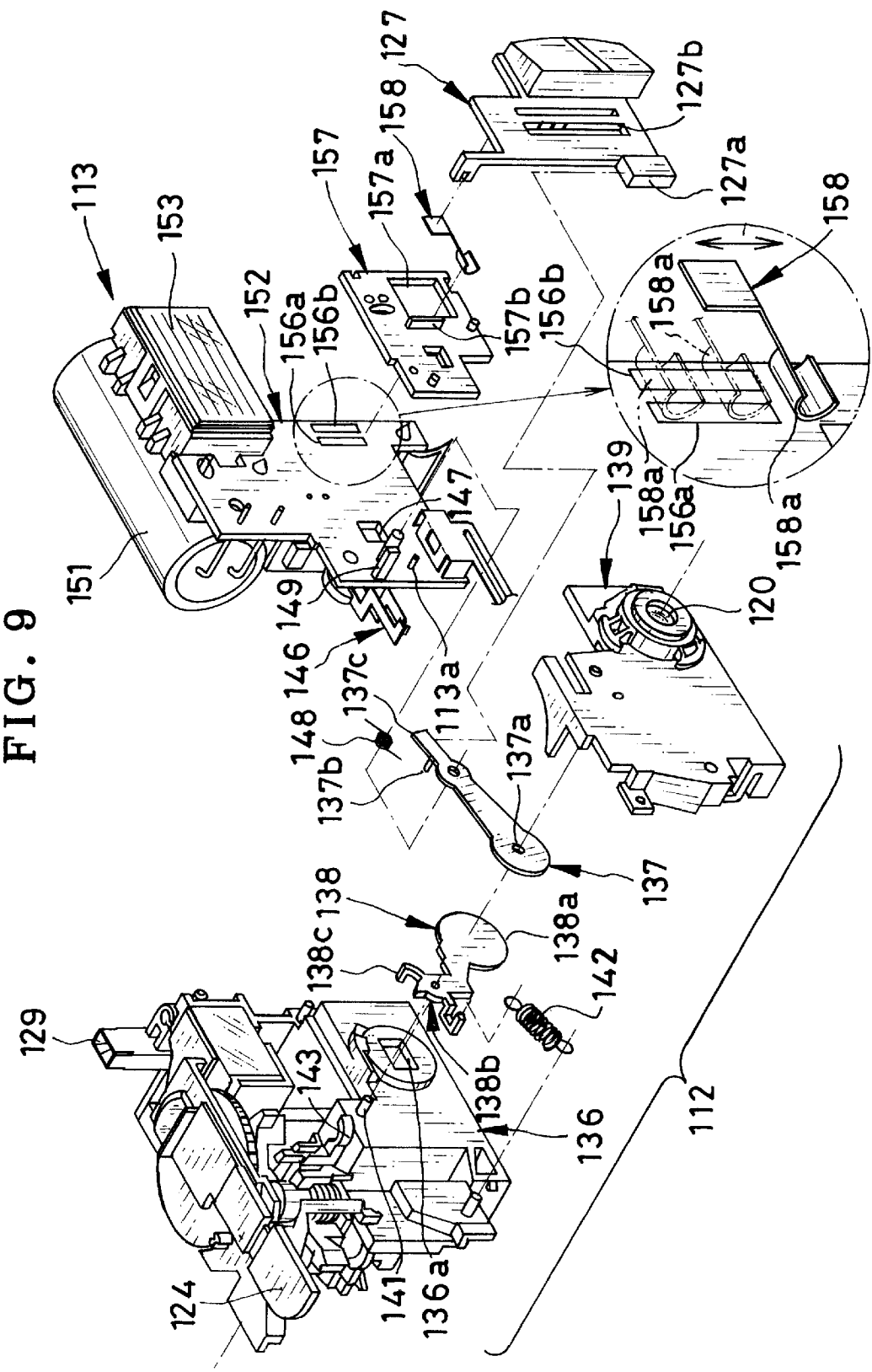
FIG. 9 is an exploded perspective illustrating an exposure unit, a flash unit and a charger member combined therewith.
Figure 11A:
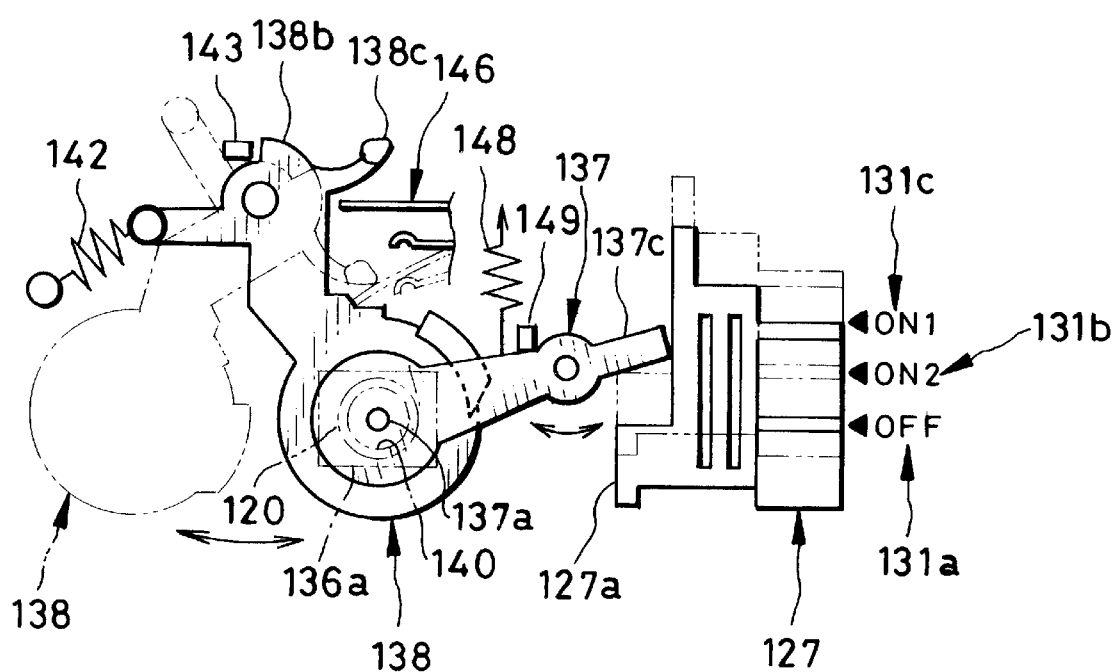
FIG. 11A is an explanatory view in elevation, illustrating the charger member and an aperture stop changer in a state of a small aperture stop.
Figure 11B:
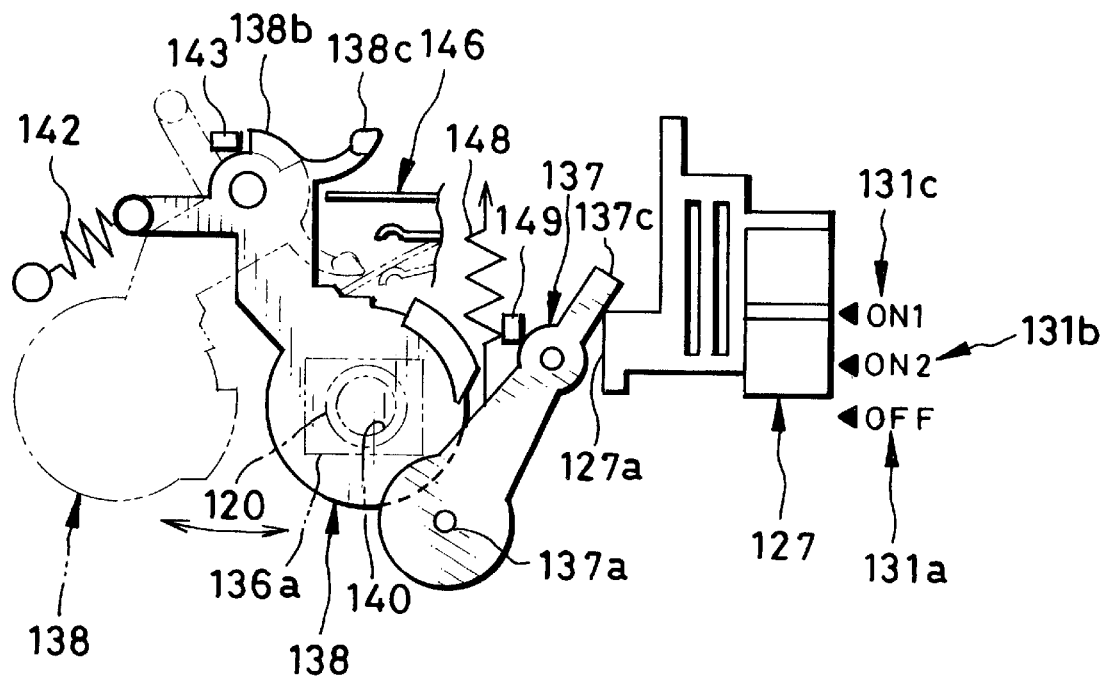
FIG. 11B is an explanatory view in elevation, illustrating the same as FIG. 11A but in a state of a large aperture stop.

In FIG. 9, a light-shielding tunnel 136 has a shutter opening 136a formed in its front, and is provided with a shutter blade 138, a changeover plate 137 and a shutter cover 139 in front of the shutter opening 136a. The shutter cover 139 covers those elements. The taking lens 120 is accommodated in the shutter cover 139. Also, an exposure opening 140 in FIGS. 11A and 11B is formed in the shutter cover 139 and located behind the taking lens 120. A diameter of the exposure opening 140 is determined to be the aperture stop of f/8.

The shutter blade 138 is included in a knocking type of shutter mechanism, and is constituted by a blade portion 138a and a pivotal portion 138b extending from its top. A pivotal pin 141 projects from the front of the light-shielding tunnel 136. The pivotal portion 138b is engaged with the pivotal pin 141, and rotatable about the pivotal pin 141.

A spring 142 is connected between the pivotal portion 138b and the light-shielding tunnel 136, and biases the shutter blade 138 toward its closed position. When the shutter release button 124 is depressed, the shutter mechanism is actuated. A knocker lever 143 knocks an end of the pivotal portion 138b. Upon the knocking, the blade portion 138a rotates toward its full open position against the bias of the spring 142, and when in the full open position, is rotated by the spring 142 toward the closed position. Thus, the shutter opening 136a is opened and closed. Note that the shutter speed of the shutter mechanism is fixed as determined in the manufacture, and is, for example, 1/60 second.

A driving projection 138c is formed with the pivotal portion 138b. When the shutter blade 138 comes to its full open position upon depression of the shutter release button 124, the driving projection 138c depresses and turns on a sync switch 146 for flash emission.

A small diameter opening 137a is formed in the changeover plate 137. A diameter of the small diameter opening 137a is determined to be an aperture stop of f/18. A pivotal pin 147 is formed on a surface of the flash unit 113, and supports the changeover plate 137, which is kept rotatable between a first position where the small diameter opening 137a is set in the photographic light path and a second position where the small diameter opening 137a is disposed out of the photographic light path.

A spring 148 is secured to the pivotal pin 147. Ends of the pivotal pin 147 are engaged with respectively projections 113a and 137b projecting from the flash unit 113 and the changeover plate 137. The changeover plate 137 is biased by the spring 148 rotationally toward the first position. Also, a stopper 149 is disposed higher than the pivotal pin 147. When the changeover plate 137 rotates to the first position, the stopper 149 contacts the changeover plate 137 and keeps it from rotating further. Thus, the changeover plate 137 is set in the first position by the stopper 149.

A driving projection 127a as a linking mechanism is formed with the charger member 127, and movable to a position contacting an end portion 137c of the changeover plate 137. When the charger member 127 is set at the third mode position 131c, the end portion 137c is pushed up by the driving projection 127a. Thus, the changeover plate 137 rotates toward the second position against the bias of the spring 148. Note that a guide member is disposed between the shutter blade 138 and the changeover plate 137, guides the shutter blade 138 and/or the changeover plate 137 and keeps those from interfering with each other.

The flash unit 113 includes a main capacitor 151, the sync switch 146, a circuit board 152, a flash emitter 153 and the like. The circuit board 152 includes a booster transformer and various circuit elements. The flash emitter 153 includes a flash discharge tube and a reflector. Also, a dry battery 154 in FIG. 8 supplies the flash unit 113 with power. The circuit board 152 includes a printed circuit pattern, and constitutes a flash circuit. First and second contact points 156a and 156b are disposed on the front face of the circuit board 152 beside the pivotal pin 147. A plate 157 is disposed in front of the circuit board 152, and keeps the charger member 127 slidable from the circuit board 152.

Figure 10:
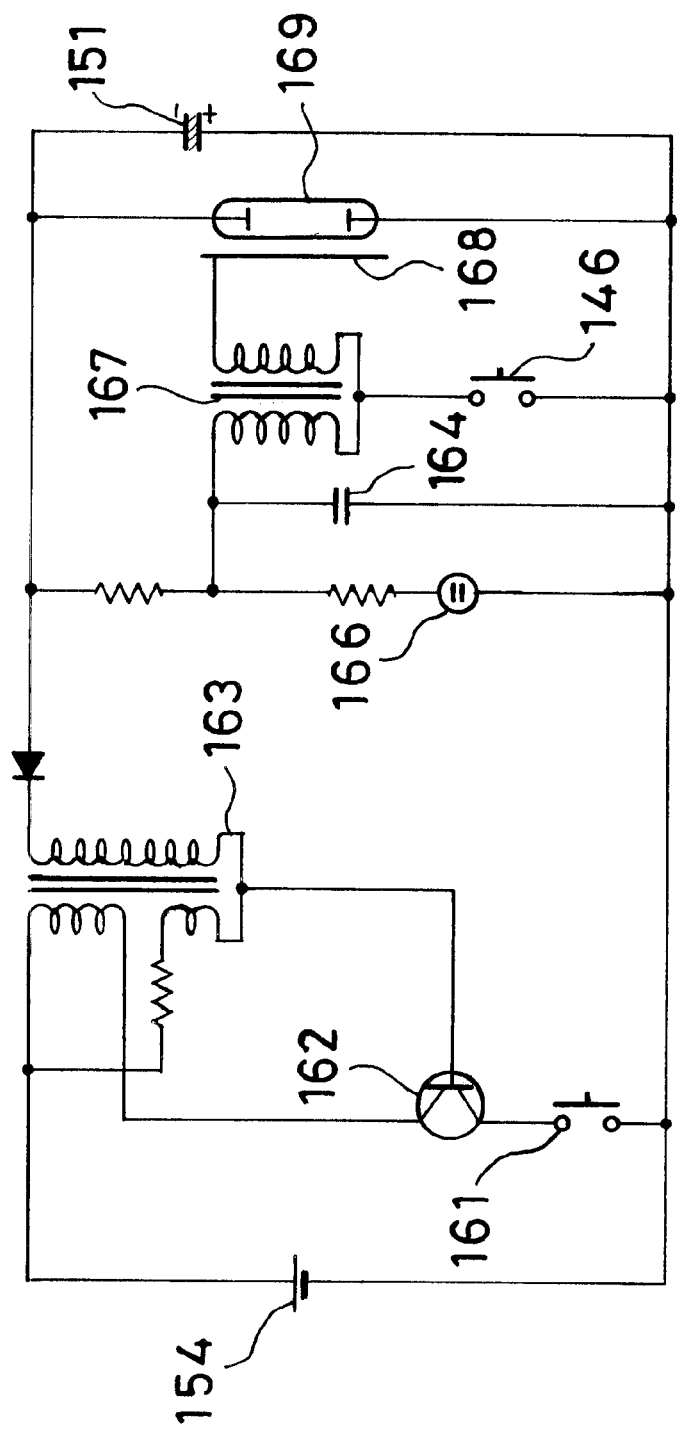
FIG. 10 is a circuit diagram illustrating a flash circuit of the flash unit.

A charger switch 161 illustrated in FIG. 10 is constituted by the contact points 156a and 156b and a contact segment 158. When the contact segment 158 interconnects the contact points 156a and 156b, charging is started. The contact segment 158 is secured to the rear face of the charger member 127. A contact end 158a of the contact segment 158 contacts the circuit board 152 through an opening 157a in the plate 157. The contact segment 158 is vertically movable together with the charger member 127.

While the charger member 127 is set in the first mode position 131a for the daylight mode, there is no contact between the contact end 158a and the contact points 156a and 156b. No charging starts. When the charger member 127 is set in the second mode position 131b for the daylight flash mode, or in the third mode position 131c for the indoor/night mode, the contact end 158a contacts the contact points 156a and 156b for interconnection or short-circuiting.

A guide groove 127b is formed in the charger member 127. A guide ridge 157b is formed on the plate 157, and engaged with the guide groove 127b. There are small notches (not shown) formed in the guide groove 127b for the three mode positions, and stopped by clicked engagement with a projection in the guide ridge 157b. This engaging mechanism with a click can keep the charger member 127 in the respective mode positions, and can cause the user to recognize that the charger member 127 is stopped suitably. Even when the user does not check the three mode positions 131a–131c by sight, he or she can set the charger member 127 to the respective mode positions.

In FIG. 10, an example of the flash circuit is illustrated. When the charger switch 161 is turned on, an oscillation transistor 162 is turned on to cause a booster transformer 163 to operate. An output current in the secondary winding of the booster transformer 163 charges the main capacitor 151 and a trigger capacitor 164. When the main capacitor 151 is charged to come to have a predetermined charged voltage, a neon tube 166 emits light. The shutter blade 138 opens to turn on the sync switch 146. The trigger capacitor 164 is discharged to cause a current to flow in an input winding of a trigger transformer 167. A trigger electrode 168, which is connected with an output winding of the trigger transformer 167, is provided with high voltage. The charge stored in the main capacitor 151 is discharged in a flash discharge tube 169, to emit flash light.

An amount of flash light is fixed according to capacitance of the main capacitor 151 and the like. The main capacitor 151 has the capacitance of, for example, approximately 60 $\mu$F, which is smaller than that of a conventional flash main capacitor from 100 $\mu$F to 150 $\mu$F. So the main capacitor 151 has a comparably small size. Also, the flash unit 113 has a guide number of approximately 5.3.

The operation of the embodiment is described now by referring to FIGS. 11A and 11B. A user rotates the winder wheel 134 to advance the photo film 119 by one frame. The shutter is cocked. The winder wheel 134 is kept from rotating by locking.

Then one of the photographing modes is selected. If a photographic field is framed with sufficient light amount, for example outdoors under daylight, then the charger member 127 is set at the letters OFF in the first mode position 131a to select the "daylight mode", as indicated by the solid lines in FIG. 11A. The first mode position 131a is the lower limit position within the slidable range of the charger member 127.

The charger member 127, when slid down to its lower limit position, is set in the first mode position 131a. Even when the charger member 127 is not pushed, it is easy to confirm that the charger member 127 is in the first mode position 131a as lower limit position. The user is enabled to designate the "daylight mode" simply without errors in the changes in the modes.

In the "daylight mode", the contact segment 158 does not contact the contact points 156a and 156b. The charger switch 161 is turned off. Thus, there is no charging of the flash circuit. As the driving projection 127a does not push up the end portion 137c, the changeover plate 137 is set in the first position, to position the small diameter opening 137a in the photographic light path.

Then the shutter release button 124 is depressed. The knocker lever 143 knocks the pivotal portion 138b to open and close the shutter blade 138. Object light incident upon the taking lens 120 is passed through the small diameter opening 137a and enters the light-shielding tunnel through the shutter opening 136a. When the shutter blade 138 comes to the full open position, the driving projection 138c turns on the sync switch 146. However, the main capacitor 151 has not been charged. No flash is emitted by the flash unit 113.

The aperture stop has the f-number of f/18. The shutter speed is 1/60 second. Thus, the EV value is 14.2. As the photo film 119 has the speed of ISO 1600, an appropriate value of the LV value is 10.2. Assuming that a photographic printer has performance of allowing an excess in the LV value by approximately +5, the upper limit of the LV value is 15.2. On the other hand, the LV value under daylight in sunny weather is approximately 10–15. Therefore, the amount of the exposure to the photo film can be in the appropriate range. Also, various objects in a frame including the principal object and the background can be in-focus in the image in the print to be obtained, because the f-number is considerably greater.

If a photographic field is framed without sufficient amount of ambient light, for example indoors or at night, then the charger member 127 is set at the letters ON1 in the third mode position 131c to select the "indoor/night mode", as indicated in FIG. 11B. The third mode position 131c is the upper limit position within the slidable range of the charger member 127. The user is caused to designate the "indoor/night mode" simply without errors in the changes in the modes.

In the "indoor/night mode", the contact segment 158 contacts the contact points 156a and 156b, to turn on the charger switch 161. The charging of the flash circuit is started. The driving projection 127a pushes up the end portion 137c. The changeover plate 137 is set in the second position to retract the small diameter opening 137a from the photographic light path. Only the exposure opening 140 is positioned in the photographic light path without being stopped down.

After the flash unit 113 is charged completely, the shutter release button 124 is depressed. When the shutter blade 138 comes to the full open position, the driving projection 138c turns on the sync switch 146. As the main capacitor 151 has been charged, the flash unit 113 emits flash light. Object light incident upon the taking lens 120 is passed through the exposure opening 140 at the normal, larger aperture stop, and enters the light-shielding tunnel.

The aperture stop has the f-number of f/8. The shutter speed is 1/60 second. Thus, the EV value is 11.9. As the photo film 119 has the speed of ISO 1600, an appropriate value of the LV value is 7.9. Assuming that a photographic printer has performance of allowing a shortage in the LV value by approximately −2, the lower limit of the LV value is 5.9. On the other hand, the LV value in an indoor scene or night scene is approximately 6–7. Therefore, the amount of the exposure to the photo film can be in the appropriate range.

The f-number of the aperture stop is considerably small. It is likely that a background object at a considerable distance is not in-focus. However, the background object is photographed only inconspicuously on the photo film 119 because of the short distance in the effectiveness of flash light and small ambient light at night. There is no problem in the printed form of the image even if the background is out of focus.

If a principal object is illuminated by rear light in a daytime outdoor scene, the charger member 127 is set at the letters ON2 in the second mode position 131b in FIG. 11A to designate the "daylight flash mode". The second mode position 131b is disposed between the positions for the "daylight mode" and the "indoor/night mode".

The second mode position 131b for the charger member 127 can be checked by a user visually with the letters ON2 and also with the engaging mechanism tangibly. Of course, he or she is obliged to check the second mode position 131b for the charger member 127 very carefully as middle position between the limit positions in comparison with the daylight mode and the indoor/night mode. However, it is expected that users intending the daylight flash mode are more skilled and more familiar with photographic techniques than users of the most unskilled type, because such users can have knowledge of using the daylight synchronized flash. Accordingly, there is no problem in the disposition of the second mode position 131b for the daylight flash mode even though the disposition is not very simple.

When the "daylight flash mode" is selected, the contact segment 158 contacts the contact points 156a and 156b in a manner similar to the "indoor/night mode". Thus, the charger switch 161 is turned on to start charging the flash unit. The driving projection 127a has a position not to push up the end portion 137c. The changeover plate 137 is set in the first position to insert the small diameter opening 137a in the photographic light path.

After the flash unit 113 is charged completely, the shutter release button 124 is depressed. Flash is emitted at the same time as the shutter operation. Object light incident through the taking lens 120 comes into the small diameter opening 137a and enters the light-shielding tunnel.

The aperture stop has the f-number of f/18. The shutter speed is 1/60 second. Thus, the EV value is 14.2. As the photo film 119 has the speed of ISO 1600, an appropriate value of the LV value is 10.2. Assuming that the photographic printer allows the excess in the LV value by approximately +5, the upper limit of the LV value is 15.2. The amount of flash light is small because of the small size of the main capacitor 151. Therefore, the amount of the exposure to the photo film 119 can be in the appropriate range. Also, various objects in a frame including the principal object and the background can be in-focus in the image in the print, because the f-number is considerably great.

After the photo film 119 is exposed, the lens-fitted photo film unit 111 is forwarded to a photo laboratory to produce prints from the photo film 119. As exposure amounts of the frames are within the appropriate range, prints with high sharpness can be obtained without irregularity in their quality. There is no frame of which an exposure amount would be over than the maximum of the appropriate range. Thus, there is no excessive increase in time required for completing the printing operation. There is no increase in the cost required for the printing operation.

In the above embodiment, the photo film has the speed of ISO 1600. However, the photo film may have the speed of ISO 800, or a speed different from ISO 1600. If the photo film has the speed of ISO 800, it is preferable that the small aperture stop can have the f-number of f/13. The photo film may be IX 240 type, 135 type, or any suitable type.

In the above embodiment, the main capacitor has the capacitance of approximately 60 $\mu$F. The guide number of the flash unit is 5.3. However, a lens-fitted photo film unit can have a main capacitor of approximately 100–150 $\mu$F and a flash unit with a guide number of 10–12, as is conventional in the art. It is possible to predetermine a combination of the f-numbers of the aperture stops and the shutter speed suitably in consideration of the photo film speed and the guide number. If the shutter speed is slower than 1/60 second, it is likely that a camera shake occurs to blur an image. Thus, a preferred range of the shutter speed is at slowest 1/60 second.

In the above embodiment, the charger member 127 is slid vertically in a straight manner. However, the charger member 127 may be slid horizontally, or moved along a curved path in an arc shape.

In the above embodiment, the changeover plate 137 is movable pivotally about an axis. However, the changeover plate 137 may be a plate slidable in a straight manner.

Furthermore, any aperture stop changer mechanism may be incorporated in a lens-fitted photo film unit for changing over the exposure opening to two or more predetermined aperture stops.

In the above embodiment, the charger member 127 is movable to the three predetermined positions. Alternatively, a signal generator may be incorporated in a lens-fitted photo film unit for generating three electrical signals representing the three modes. For example, one, two or three pushbuttons may be used for inputting the signals.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit including a main body pre-loaded with photo film, a flash unit, secured to said main body, for emitting flash light to a photographic field, an exposure opening, formed in said main body, for introducing light from said photographic field to said photo film, and a shutter mechanism, secured to said main body, for opening and closing said exposure opening, said lens-fitted photo film unit comprising:

a charger switch for causing said flash unit to store charge upon being turned on;

an aperture stop changer, directly shiftable to first and second set positions, for stopping down said exposure opening when in said first set position; and a linking mechanism for allowing turning on and off said charger switch when said aperture stop changer is in said first set position, and for forcibly turning on said charger switch when said aperture stop changer is in said second set position.

2. A lens-fitted photo film unit as defined in claim 1,
  wherein said light extends axially through said exposure opening, and
  wherein said aperture stop changer includes:
    a changeover plate linearly slidable in a plane transverse to an axis of said light and movable to said first and second set positions; and
    a small diameter opening, formed in said changeover plate, having a diameter smaller than a diameter of said exposure opening, set at said exposure opening when said changeover plate is in said first set position, and set away from said exposure opening when said changeover plate is in said second set position.

3. A lens-fitted photo film unit as defined in claim 2, further comprising a charger member for turning on said charger switch upon being operated externally;
  wherein said charger switch is disposed to face a path where said changeover plate is movable;
  said linking mechanism includes a first end of said changeover plate, and said first end is away from between said charger switch and said charger member when in said first set position, and is between said charger switch and said charger member when in said second set position to press a front of said charger switch.

4. A lens-fitted photo film unit as defined in claim 2, further comprising a charger button portion, movable with said changeover plate and extending from one end portion of said changeover plate closer to said charger switch, said charger button portion being resiliently deformable for turning on said charger switch upon being depressed externally when said changeover plate is in said first set position.

5. A lens-fitted photo film unit as defined in claim 4, wherein said linking mechanism includes a rear face of said end portion, said rear face is away from a front face of said charger switch when said changeover plate is in said first set position, and pushes said front face of said charger switch when said changeover plate is in said second set position.

6. A lens-fitted photo film unit as defined in claim 5, further comprising:
  a front cover for covering a front of said main body;
  an access opening, formed in said front cover, and disposed in front of said charger button portion; and
  an operation projection, formed to project from said charger button portion, operated externally through said access opening, for sliding of said changeover plate and for depression of said charger button portion.

7. A lens-fitted photo film unit as defined in claim 2, further comprising a large diameter opening, formed in said changeover plate, having a diameter larger than said diameter of said small diameter opening, and set at said exposure opening when said changeover plate is in said second set position.

8. A lens-fitted photo film unit as defined in claim 7, wherein said large diameter opening comprises an arc-shaped recess formed in one end of said changeover plate.

9. A lens-fitted photo film unit as defined in claim 2, wherein said photo film has speed from ISO 800 to ISO 3200, said exposure opening has an f-number from f/5.6 to f/8, and said small diameter opening has an f-number from f/13 to f/27.

10. A lens-fitted photo film unit as defined in claim 1, further comprising a charger member linearly slidable among first, second and third mode positions, wherein said aperture stop changer includes a changeover plate moveable to said first and second set positions, and wherein said charger member, when in said first mode position, turns off said charger switch, and when in said second mode position, turns on said charger switch and causes said linking mechanism to move said changeover plate to said first set position, and when in said third mode position, causes said linking mechanism to move said changeover plate to said second set position.

11. A lens-fitted photo film unit as defined in claim 10, wherein said linking mechanism includes:
  an end portion of said changeover plate;
  a spring for biasing said changeover plate to said first set position;
  a driving projection, formed to project from said charger member, disposed close to said end portion, wherein said driving projection, when said charger member is in said first and second mode positions, is moved away from said end portion, and when said charger member is in said third mode position, presses said end portion to move said changeover plate to said second set position.

12. A lens-fitted photo film unit as defined in claim 11, wherein said changeover plate is pivotally movable.

13. A lens-fitted photo film unit as defined in claim 10, wherein said flash unit has a circuit board;
  said charger switch includes first and second contact points disposed in a front of said circuit board;
  said charger member includes a contact segment for being away from at least one of said first and second contact points when in said first mode position, and for contacting said first and second contact points simultaneously when in said second and third mode positions.

14. A lens-fitted photo film unit as defined in claim 12, wherein said second mode position is disposed between said first and third mode positions.

15. A lens-fitted photo film unit as defined in claim 14, wherein said charger member is slidable to said first, second and third positions.

16. A lens-fitted photo film unit including a main body pre-loaded with photo film, a flash unit, secured to said main body, for emitting flash light to a photographic field, an exposure opening, formed in said main body, for introducing light from said photographic field to said photo film, said light extending axially through said exposure opening, and a shutter mechanism, secured to said main body, for opening and closing said exposure opening, said lens-fitted photo film unit comprising:
  a charger switch for causing said flash unit to store charge upon being turned on;
  a changeover plate directly slidably movable to first and second set positions in a plane transverse to an axis of said light;
  a small diameter opening and a large diameter opening formed in said changeover plate, said small diameter opening having a diameter smaller than a diameter of said exposure opening, set at said exposure opening when said changeover plate is in said first set position, for stopping down said exposure opening, said large diameter opening having a diameter larger than said diameter of said small diameter opening, set at said exposure opening when said changeover plate is in said second set position; and
  a linking mechanism for allowing turning on and off said charger switch when said changeover plate is in said first set position, and for forcibly turning on said charger switch when said changeover plate is in said second set position.

17. A lens-fitted photo film unit including a main body pre-loaded with photo film, a flash unit, secured to said main body, for emitting flash light to a photographic field, an exposure opening, formed in said main body, for introducing light from said photographic field to said photo film, and a shutter mechanism, secured to said main body, for opening and closing said exposure opening, said lens-fitted photo film unit comprising:

a charger switch for causing said flash unit to store charge upon being turned on;

an aperture stop changer, shiftable to first and second set positions, for stopping down said exposure opening when in said first set position;

a charger member, linearly slidable among first, second and third mode positions upon being operated externally, for turning off said charger switch when in said first mode position, and for turning on said charger switch when in said second and third mode positions; and a linking mechanism for shifting said aperture stop changer to said first set position when said charger member is in said first and second mode positions, and for shifting said aperture stop changer to said second set position when said charger member is in said third mode position.

18. A lens-fitted photo film unit as defined in claim 17, wherein said aperture stop changer includes:

a changeover plate movable to said first and second set positions; and a small diameter opening, formed in said changeover plate, having a diameter smaller than a diameter of said exposure opening, set at said exposure opening when said changeover plate is in said first set position, and set away from said exposure opening when said changeover plate is in said second set position.

19. A lens-fitted photo film unit as defined in claim 18, wherein said second mode position is disposed between said first and third mode positions.

20. A lens-fitted photo film unit as defined in claim 18, wherein said linking mechanism includes:

an end portion of said changeover plate;

a spring for biasing said changeover plate to said first set position;

a driving projection, formed to project from said charger member, disposed close to said end portion, wherein said driving projection, when said charger member is in said first and second mode positions, is moved away from said end portion, and when said charger member is in said third mode position, presses said end portion to move said changeover plate to said second set position.

21. A lens-fitted photo film unit as defined in claim 18, wherein said flash unit has a circuit board;

said charger switch includes first and second contact points disposed in a front of said circuit board;

said charger member includes a contact segment for being away from at least one of said first and second contact points when in said first mode position, and for contacting said first and second contact points simultaneously when in said second and third mode positions.

* * * * *